UNITED STATES PATENT OFFICE.

JOHN H. KELLOGG, OF BATTLE CREEK, MICHIGAN.

PROCESS OF PRODUCING ALIMENTARY PRODUCTS.

SPECIFICATION forming part of Letters Patent No. 604,493, dated May 24, 1898.

Application filed February 16, 1897. Serial No. 623,711. (No specimens.)

*To all whom it may concern:*

Be it known that I, JOHN H. KELLOGG, of Battle Creek, in the county of Calhoun and State of Michigan, have invented an Improved Process of Producing an Alimentary Product, of which the following is a specification.

My new and improved product is made from edible nuts, preferably peanuts and such other nuts as can be easily blanched or freed from skins, and is a semisolid, having about the same consistence as hard butter or soft cheese.

The preliminary steps of the preferred process or method are the following: The shells of the nuts being removed, the kernels are first blanched by removing the skins, and this may be effected by any of the ordinary methods by soaking the kernels in cold or warm water for a short time and then passing them through a blanching-machine, by which the skins are rubbed off. The next step consists in thoroughly cooking the blanched kernels, which is best done by either boiling them for several hours—say four to six—in water in crocks or vessels set over a fire or placed in an oven, whereby the oil contained in the kernels is fixed and the starch hydrated and in part converted into dextrine. Instead of boiling the kernels they may be roasted. The cooked product is then ground or passed between rollers, and thereby reduced to a pulpy mass. Water is added to the nut paste, preferably in the proportion of one part of the former to two of the latter, by weight, and the two are then thoroughly mixed, thus producing a thick creamy emulsion or soft pasty mass. Such emulsified product is placed in tin cans, which are then sealed hermetically and placed in a retort and subjected for a considerable time to heat between 213° and 240° Fahrenheit, the preferred range being 215° to 230°. The preferred mode of applying heat and pressure is by means of steam; but I do not restrict my process in this regard, since it is practicable to obtain substantially the same result by other methods. Thus the sealed cans may be submerged and heated in a solution of chlorid of calcium or sodium, whose specific gravity raises its boiling-point above 212° and whose pressure on the can counteracts, within certain limits, the internal pressure and bursting tendency due to vaporization and consequent expansion of the water contained in them. Heat might also be applied by means of heated atmospheric air under compression. The cans should be thus treated from one to four hours to effect the desired change in the nut product. The time will be varied chiefly according to the size of the cans.

By mixing the water as described and by exposure to a high temperature for the time named the product is so modified as to render it a practically new one—that is to say, the nuts are thoroughly cooked before being converted into paste, and the subsequent treatment at 213° or above is not applied to the paste for the purpose of cooking it in the usual sense of the term, but to develop special qualities which are not obtainable by the ordinary cooking. In other words, it is chiefly to develop special flavors in the article which involves a change in consistency or density in a marked degree, so that it becomes a product differing in many ways from the original paste.

At 212° Fahrenheit the product is not hardened, but remains quite soft and pasty and is not agreeable to the taste, while slightly above 240° it develops an acrid quality, which impairs its value as a food. After many experiments it has been found that an intermediate temperature between 215° and 230° is necessary to the best result, it being that at which the product solidifies, changes in color, volume, and taste, and becomes very palatable and easily digestible. The product shrinks sufficiently to enable it to be easily removed by cutting out the head and inverting the can. It is also rendered agreeable in flavor and easily digestible.

For greater definiteness of description it may be further stated that the product is a semisolid or solid having a good degree of tenacity and in consistence ranging ordinarily between soft cheese and hard cheese or dried beef, as well as being slightly brown in color. The same is capable of retaining the forms into which it may be molded or cut, so that it may be handled and used in slices or blocks, &c., as convenience may require.

The product may be cut up in thin or thick slices like cheese and served as desired. It has a decidedly meaty flavor and, with a little salt added, is a very agreeable article of food, which is highly nutritious and may be readily digested by persons who cannot eat nuts in their natural state. It may be used as a substitute for meat or ordinary butter and utilized in various other ways as a new article of food. Being thoroughly sterilized it will keep indefinitely.

The process or method before described may be varied by omitting the preliminary cooking of the blanched nut-kernels—that is to say, by blanching, grinding, and thus reducing to a fine pulpy mass, then adding water, and cooking as in the first place. The cooking needs also to be continued longer than in the first case. The product obtained differs from the other mainly in color, it being lighter. The proportion of water may be slightly increased or diminished.

Various fruits and farinaceous products may be combined with the ground nut mass and cooked along with the same in the sealed cans, thereby making various wholesome, nutritious, and palatable combinations.

What I claim is—

1. The process of producing the improved alimentary product which consists in blanching and thoroughly cooking nut-kernels, and reducing them to a pulp, then adding water, and sealing the pasty mass in cans, and subjecting such cans to the action of steam at a temperature ranging between 213° and 240° Fahrenheit, for a considerable period, that is to say until the mass becomes changed or modified, as specified.

2. The process of producing the improved alimentary product which consists in blanching and thoroughly cooking nut-kernels, and reducing them to a pulp, then adding water, and sealing the pasty mass in cans, and subjecting such cans to the action of simultaneous pressure and heat ranging between 213° and 230° Fahrenheit for a considerable period, that is to say until the mass becomes changed or modified, as specified.

3. The process of producing the improved alimentary product described, the same consisting in the following steps, first, blanching the nut-kernels; second, thoroughly cooking them; third, reducing them to a pulp; fourth, adding water in the proportion of about one to two; fifth, sealing the soft, pasty and emulsified mass in tin cans; and, sixth, in subjecting such cans to the action of steam at a temperature ranging from 213° to 240° Fahrenheit for a period varying from one to four hours, whereby the mass becomes converted into a product having the characteristics specified.

JOHN H. KELLOGG.

Witnesses:
WILL. K. KELLOGG,
NEWTON K. SHELDEN.